Figure 3:
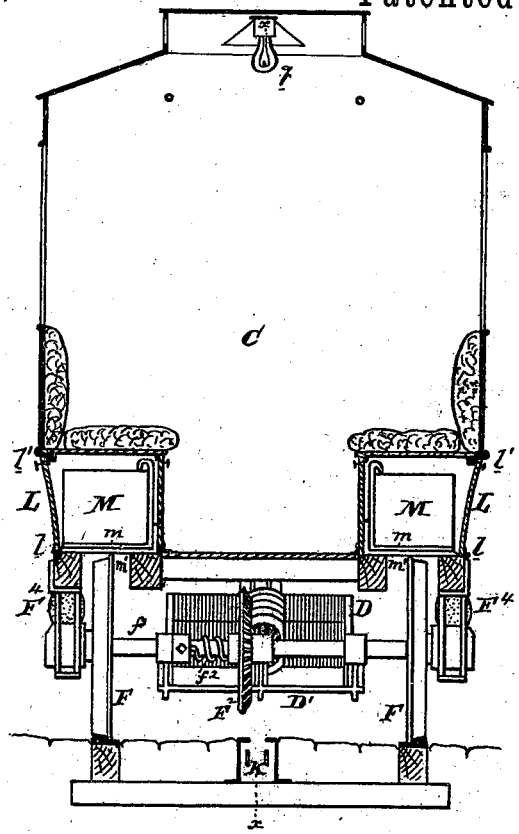

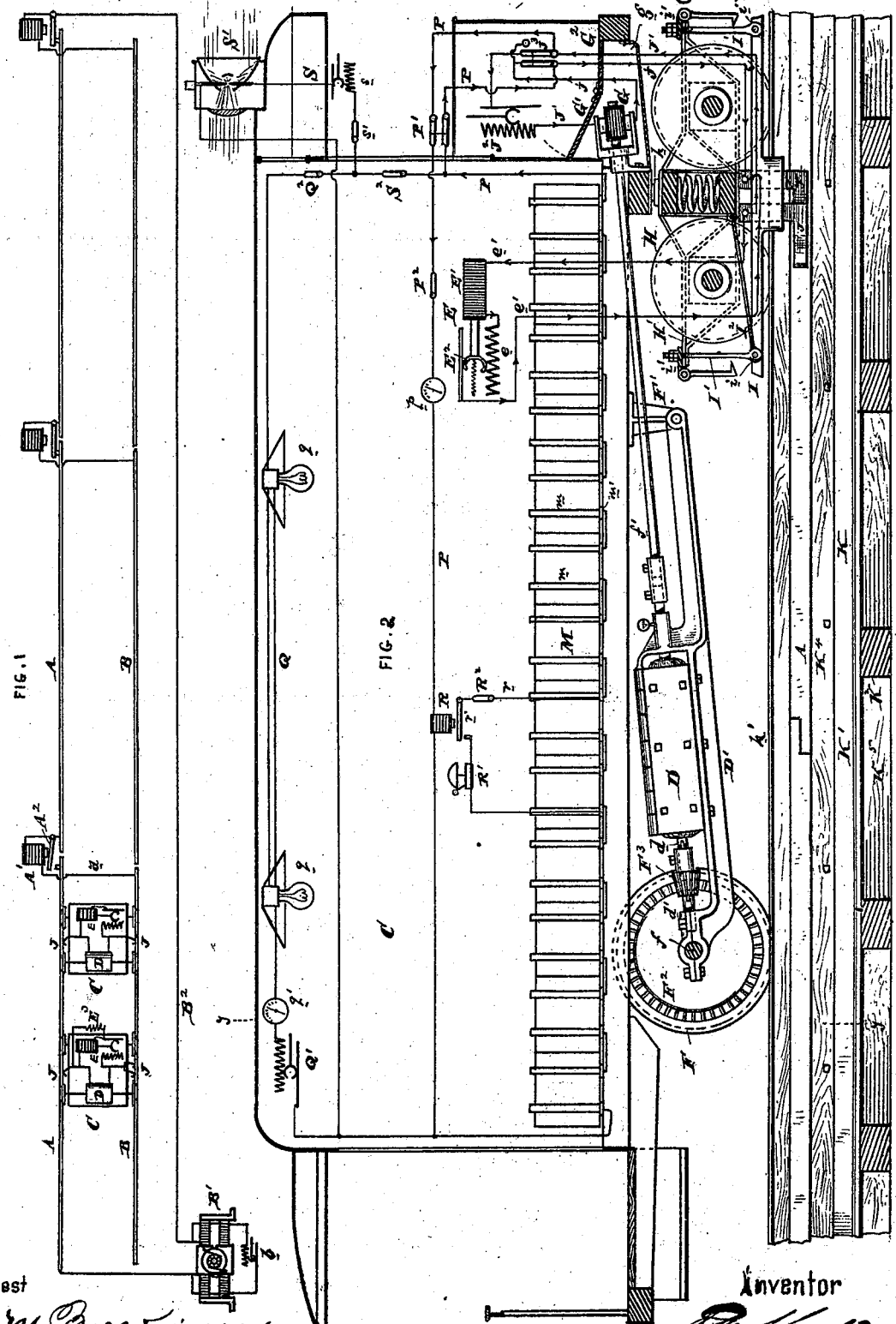

(No Model.)  R. M. HUNTER.  2 Sheets—Sheet 2.
ELECTRIC LOCOMOTIVE.
No. 502,297.  Patented Aug. 1, 1893.

Attest
S. J. Yerkes.

Inventor.

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC LOCOMOTIVE.

SPECIFICATION forming part of Letters Patent No. 502,297, dated August 1, 1893.

Application filed November 30, 1886. Serial No. 220,240. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and consists of certain improvements fully set forth in the following specification and shown in the accompanying drawings which form a part thereof.

My invention has particular reference to the location of the motor under the car-body, and bringing the commutator to the front platform where it can be observed and kept in working order. By this construction that portion of the motor which requires no particular care can be located close to the drive wheels to make the most rigid connection with the axle, and the commutator and its brushes can be kept in perfect condition and guarded against dirt and dust. The motor is thus formed of the field magnets and armature located at a point where the power is to be applied directly to perform the work, while the commutator for controlling the currents traversing the armature or moving coils is located at a distance from it and connected by suitable circuits. The source of electric energy may be located at a considerable distance from the motor and the current therefrom will be passed through the commutator and thus properly delivered to the armature or moving coils.

The motor proper is provided with journal boxes which are journaled to the rear axle so that the motor may rise and fall at its other end and at the same time be mechanically connected at all times to rotate the axle to which it is journaled. The forward part of the motor is provided with a frame which is connected to the car-body between the forward wheels and rear wheels, and by which it is elastically supported upon springs, which springs also support the car-body. The main power wheel is loosely supported upon the rear axle and connected to it by means of a coiled or other spring, and the motor is geared to said power wheel so that its shaft may make a portion of a revolution before putting the axle into rotation.

Other details of construction are fully set out hereinafter.

In the drawings:—Figure 1 is a plan view of an electric railway. Fig. 2 is a sectional elevation of a car and road bed on line $x\ x$ of Fig. 3; and Fig. 3 is a cross sectional elevation on line $y\ y$ of Fig. 2.

A and B are two lines of working conductors, and are made in sections. The conductors may be either the rails or auxiliary conductors, suspended, exposed on the surface of the road bed, or placed in a slotted conduit. One end of the conductor A is connected with one terminal of the generator B' and the opposite end of the corresponding section of conductor B is connected by wire $a$ with the adjacent end of the next section of conductor A and so on. In this conductor A are located magnets A' which operate switches $A^2$, substantially in the manner set out in my application Serial No. 192,187, so that when no motors are in circuit with a section B the switch A' will operate to close the break between two succeeding sections A and vice versa as clearly set out in my Patent No. 424,607, dated April 1, 1890. The current passes from the primary generator B' through the conductor A, thence through the motors on the cars C to the conductor B and from this conductor B the current passes through the wire $d$ to the magnet A' and from said magnet to the next section of the conductor A, and thence through the armatures $A^2$ of the succeeding magnets A' and succeeding sections A to the return conductor $B^2$, and thence to the primary generator B' again. When the cars C are on any section of conductors the armature $A^2$ of the magnet A' between the adjacent sections is caused to be attracted so as to open the circuit between the successive sections of the conductor A as shown in Fig. 1. The distant end of the conductor A is connected with the other terminal of the generator B'. The generator B' may be supplied with the regulator $b$ or other suitable regulating device and is shunt or compound wound so as to be self regulating and give a varying current in ampères while maintaining a substantially constant potential.

It is immaterial to my invention what the particular system of conductors may be. It is not even necessary to my invention that line conductors shall be used at all as the car may be operated by means of a battery carried upon it as referred to hereinafter.

C are electrically propelled vehicles, cars, or locomotives. These cars maintain electrical connection with the conductors A B by suitable current collectors J. D are the electric motors on said cars, and J' is the motor circuit which may have a resistance changer $J^2$ under the control of the operator to vary the speed or power of the motor or stop the car, and a current reversing switch $J^3$ for reversing the current passing to the motor.

E is a shunting device for shunting more or less of the line current around the motors on each car. It consists of a shunt circuit $e$ in multiple arc connection with the motor D and having a variable resistance $e$, more or less of which is put into or out of circuit by a switch $E^2$ operated by an electro helix and core $E'$, which helix is in the shunt circuit and directly controlled by the current therein. To reduce the amount of current passing through the helix an additional shunt $E^3$ (see Fig. 1) might be placed in the shunt $e$ around the helix. It is immaterial to my invention how this regulator is made so long as it accomplishes the objects sought to be covered.

It will now be understood that if a section of conductors be supposed to hold, in multiple arc connection, five cars, one-fifth of all the current will pass through each motor or car. If now, two cars are from any cause taken off the section, the remaining three cars will still only receive three-fifths of the entire current as their shunting devices E respond to shunt two-fifths of the current around the motors on the cars; hence the total resistance to the line is constant and the current passing down the line is in no wise diminished. This regulation is automatic, but it is evident that the result might be accomplished by operating the shunting devices by hand. This description has been given with particular reference to a system employing series and multiple arc connection of cars combined, but it is also evident that it is applicable where the entire line is operated on the multiple arc system, (which corresponds to one section of the above described system) as the regulator shunt device would operate to increase or reduce the current flowing through the motor to compensate for the change in the resistance of the line according as the motor is near to or very far from the generation station. It is my object to use comparatively high tension currents and working conductors of small sectional area. In long lines where a large number of cars are on circuit this line resistance is an important factor in automatic regulation.

The car shown in Fig. 2 is well adapted to city railways, and consists of the long body supported at its forward end upon a four wheeled truck H by a pivot $h$. The truck has a small wheel base, and hence can turn sharp curves; and may be made in any well known manner, having suitable springs. The rear end of the car body is supported on two wheels F secured to their axle $f$ which is journaled in boxes in the usual way, and support the car body through springs $F^4$ (see Figs. 2 and 3). By this construction of supporting wheels the car is maintained from jumping or swinging up and down as is now so frequently seen on horse and cable railways. In those systems it is not so objectionable, but in an electric railway the wheel base should under no circumstances be subjected to jar owing to the necessity of using the current collectors. By placing the four wheeled truck forward, a rapid travel can be maintained without the least tendency of jumping the track at quick curves.

D is the electric motor and is supported on the frame D' journaled or hinged upon the rear axle $f$, and at its forward end is connected at F' to the car body between the forward truck and axle $f$. By this means the car body may rise and fall on its springs without changing the distance between the motor and axle $f$. The motor shaft $d$ is supported in the journal $d'$ close to the axle $f$ and is provided with the bevel pinion $F^3$ adjustable to and from the axle $f$, and adapted to mesh with the wheel $F^2$ secured to the axle $f$, preferably through a coiled spring connection $f^2$ (Fig. 3) which is more or less similar to the construction set out in my application Serial No. 217,945. This elastic connection allows the motor to start up more easily and overcome the inertia of the car at rest. I do not limit myself to any particular connection between the motor shaft and car axle as there are a large number of mechanical connections or power transmitters which might be used. The motor proper is located close to the rear axle $f$ and increases the traction, while the commutator G of the motor is brought forward to the front platform $G^2$ and its sections are connected with the armature by a long flexible tubular shaft $f'$.

As shown, the commutator is located immediately below the front platform and may be inspected or adjusted by a door G', and protected below from dust and dirt by a case or covering $g$. By this construction I am enabled to locate the weight of the motor where it is best needed, and the commutator where it can be inspected and adjusted. The body of the motor would not require protection as the journals may be especially designed to keep out the dirt. The shaft $f'$ should be strong enough to resist torsional action so as to maintain proper connection between the commutator and its brushes with reference to the position of the armature coils in the field, but may be slightly flexible otherwise.

It is evident that the motor may be either a shunt or series wound machine, and the field magnets may revolve as set out in my Patent No. 434,391, dated August 12, 1890, in place of the armature rotating.

The collectors J are carried by the pivoted truck through the mediation of a collector frame I hung by bolts I' from the truck frame H'. These bolts have screws and nuts $i'$ by which the height of the frame I may be adjusted to bring the collectors J in line with the conductors. These bolts I' are hinged to the frame I at $i$, and this frame is also connected to the truck frame by a link or drag bar $I^2$. This construction will allow all the lateral play required to follow inequalities in a slotted conduit or conductors and in passing around curves. The collector frame has the lower central portion made to project down through the slot of a conduit and the collectors are made flat and pass up through the same, being insulated from it. These collectors are arranged in front of each other to take up as little space in width as possible, but at their points of contact with the conductors A and B are in the same transverse line so as not to produce twisting, binding, or excessive torsional action of the collector frame; and these collectors are in the center of the truck wheel base where but a small amount of lateral play will be required. By putting the collectors on the truck they may follow the curves more readily and irrespective of the position of the car body.

The position of the rear or drive wheels is in front of the rear platform and in such a position that the maximum traction will be produced with a full load. It is a well known fact that in a crowded car the rear wheels receive by far the greatest load, and in this case the effect is still further increased by locating the forward wheels up under the extreme front of the car body so that every passenger in the car puts an increase of traction on the rear wheels.

M represents a series of cells of a secondary battery. These cells are located under the seats of the car as shown in Fig. 3 and may be inserted and removed through side doors which may be upon the outside of the car as set out in my application, Serial No. 214,309, Patent No. 384,911, granted June 19, 1888, or upon the inside as indicated in this application in which L represents the doors hinged at $l$ and provided with locks or catches $l'$. In this case the outside walls of the compartments under the seats are also provided with doors L. Either or both of these doors may be used in changing or inspecting the battery cells which would be often if charged in a central station.

The batteries may be charged from the motor circuit, or may be used to supply current to the motor when desired, or when necessity requires. The secondary batteries may be utilized to supply current to electric lamps $q$, to light the car, said lamps being in multiple arc connection in circuit Q which may be provided with a current indicator $q'$ and resistance changer Q'. It may also be used for supplying current to the head light S' which has its own circuit S, resistance changer $s$, and circuit breaker $s'$. A switch $S^2$ may be used to extinguish all of the lights; switch $s'$, the headlight alone; and switch $Q^2$ the interior lights alone.

To indicate when the secondary batteries are fully charged, I provide a signal circuit $r$ including one or more cells of the secondary battery (but only a small portion of the whole), and locate in said circuit a key $R^2$ to break the circuit permanently, a switch $r'$ to close the circuit temporarily, and an alarm R'. The switch $r'$ is operated by an electromagnet R in the charging circuit P. So long as the charging current is of a given strength stronger than the secondary or reverse current of the battery the magnet R will hold the switch $r'$ open, but once the secondary battery is sufficiently charged the power of the magnet is weakened and the switch drops, sounding an alarm. The switch R' is then opened.

I have described the general features of my improvements but it is to be understood that I do not limit myself to the details as they may be modified in various ways without departing from my invention.

In this application I do not claim the following features, as they form subject matter of a divisional application, Serial No. 462,262, filed February 14, 1893. The said features are:

The combination of field magnets, a moving armature having coils, a commutator for controlling the current flowing through the coils of the armature arranged at a distance from the armature, circuits between the commutator and armature, brushes for the commutator, and electric circuits including the field magnets and brushes of the commutator.

An electro magnetic motor consisting of field magnets, an armature deriving current from the same source of power, combined with a commutator for one of the said parts located at a distance therefrom, and connecting circuits between the commutator and said part of the motor.

An electro magnetic motor consisting of field magnets and armature deriving current from the same source of power, combined with a commutator for the armature located at a distance therefrom, and flexible connecting circuits between the commutator and said armature of the motor.

The combination of a stationary source of electric energy, line circuits leading therefrom to a distant place, an electro magnetic motor consisting of armature and field magnets receiving current from said stationary source of electric energy, and a commutator located at a distance from the armature and field magnets to govern the movements of said armature.

The combination of a stationary source of electric energy, line circuits leading therefrom to a distant place, an electro magnetic motor consisting of armature and field magnets receiving current from said stationary source of electric energy, a commutator located at a distance from the armature and field magnets to govern the movements of said armature, and a switch for cutting the motor out of circuit without interrupting the continuity of the line circuit.

In this application I do not claim the system of supplying current of constant potential to two or more cars in parallel and each provided with a series motor and suitable regulating devices, as said features form subject matter of a divisional application, Serial No. 471,245, filed April 21, 1893.

Having now described my invention, what I claim as new, and desire to secure by Letters Patent, is—

1. The combination in an electrically propelled vehicle, of a body part having seats, wheels at the forward end of the body part pivoted thereto on a vertical axis, rear wheels and axle arranged near the rear end of the body part, springs supporting the body part upon the axle and wheels, an electric motor arranged between the forward and rear wheels and hinged upon the rear axle, and a power transmitting connection between the motor and the axle to which it is hinged.

2. The combination in an electrically propelled vehicle, of the body, a pivoted truck at or near one end, a pair of wheels near the other end having boxes fixed against lateral movement, on the vehicle body an electric motor arranged under the vehicle body and connecting with the fixed pairs of wheels or their axle by a power transmitting device, and a hinged frame supporting said motor and journaled on the axle of said pair of wheels.

3. The combination in an electrically propelled vehicle, of the body, a pivoted truck at or near one end, a pair of wheels near the other end having boxes fixed against lateral movement, an electric motor connecting with the fixed pair of wheels, or their axle, a hinged frame supporting said motor journaled on the axle of said pair of wheels, and a connection between the other or free end of said frame and vehicle body.

4. In an electrically propelled vehicle, the combination of the body having an operator's platform, supporting wheels therefor, an electric motor connecting therewith and supported under the vehicle body and having its commutator brought up to within operative position of the operator's platform.

5. In an electrically propelled vehicle, the combination of the body having an operator's platform, supporting wheels therefor, an electric motor connecting therewith and supported under the vehicle body and having its commutator brought up to within operative position of the operator's platform, and a dust case or cap to inclose the commutator.

6. In an electrically propelled vehicle, the combination of the body having an operator's platform, supporting wheels therefor, an electric motor connecting therewith and supported under the vehicle body and having its commutator brought up to within operative position of the operator's platform, and a trap door in the platform to expose or protect the commutator.

7. In an electrically propelled vehicle, the combination of the body having an operator's platform, supporting wheels therefor, an electric motor connecting therewith and supported under the vehicle body and having its commutator brought up to within operative position of the operator's platform, a trap door in the platform to expose or protect the commutator, and a dust case to inclose the commutator from below.

8. The combination of the vehicle body, having a front platform, supporting wheels therefor, an electric motor supported by the vehicle and connecting with the said wheels, the commutator and brushes of said motor being located at the front platform, and a long electrical connection between the motor armature and commutator.

9. The combination of the vehicle body having a front platform, supporting wheels and axles for said body, and an electric motor connecting with the rear axle or its wheels and having a long obliquely arranged commutator shaft extending to the front platform and carrying the commutator.

10. The combination of the vehicle body having a front platform, supporting wheels and axles for said body, and an electric motor connecting with the rear axle or its wheels having a long obliquely arranged flexible commutator shaft extending to the front platform and carrying the commutator.

11. The combination of the vehicle body, supporting wheels located close to the front end and supporting wheels located at some distance from the rear end, and a motor mechanically connecting with the rear wheels or their axle and journaled upon the rear axle.

12. The combination of the vehicle body, supporting wheels located close to the front end and supporting wheels located at some distance from the rear end, and an electric motor connecting with the rear wheels or their axles located close to them to increase the traction, and having its commutator brought to the forward part of the vehicle.

13. The combination of a vehicle body, supporting wheels therefor, an electric motor to propel the vehicle and connecting with the wheels or their axle, and a dust cap or casing inclosing the commutator and brushes alone and carried with the vehicle.

14. In an electrically propelled vehicle, the supporting wheels and their axles in combination with an electric motor, a gear wheel supported upon the axle and connected therewith by a coiled spring, surrounding the axle and a spur wheel connecting the motor with the gear wheel.

15. In an electrically propelled vehicle the supporting wheels and their axles, in combination with an electric motor, a power wheel supported upon the axle and connected therewith by a coiled spring, surrounding the axle and a mechanical power transmitting connection between the motor and power wheel.

16. The combination of an electrically propelled car having an unobstructed motor platform at its forward end having doors therein, axles and wheels located under the car body of the said car, and an electric motor journaled upon one axle and mechanically connected to rotote it and having its commutator arranged below the platform whereby access may be had thereto by opening the doors.

17. The combination in an electrically propelled car, of a car body having a motor operating platform at its forward end and a passenger platform at its rear end, a pivoted truck under the front or motor operating platform, wheels and axles supporting the rear end of the car body, and an electric motor journaled upon the rear axles and adapted to rotate it and having its commutator arranged under the front or motor operating platform.

18. In an electrically propelled vehicle, the combination of the front and rear axles and their wheels, an electric motor journaled upon the rear axle and mechanically connected to rotate it, and an elastic support for the free end of the motor upon the forward wheels and axles.

19. In an electrically propelled vehicle, the combination of the supporting wheels and axles, an electric motor journaled upon and mechanically connected to rotate one of the axles, and an elastic support between the free end of the motor and the other axle or axles.

20. In an electrically propelled vehicle, the combination of a pivoted truck and a rear axle and wheels for supporting the car body, and an electric motor journaled upon the rear axle and mechanically connected to rotate it and having its free end elastically supported upon the axles of the pivoted truck.

In testimony of which invention I hereunto set my hand.

RUDOLPH M. HUNTER.

Witnesses:
E. M. BRECKINREED,
RICHD. S. CHILD, Jr.